US009497187B2

(12) United States Patent
Griffith et al.

(10) Patent No.: US 9,497,187 B2
(45) Date of Patent: Nov. 15, 2016

(54) CONTROLLING A DISCOVERY COMPONENT, WITHIN A VIRTUAL ENVIRONMENT, THAT SENDS AUTHENTICATED DATA TO A DISCOVERY ENGINE OUTSIDE THE VIRTUAL ENVIRONMENT

(71) Applicant: INTERNATIONAL BUSINESS MACHINES CORPORATION, Armonk, NY (US)

(72) Inventors: John A. Griffith, Austin, TX (US); Daniel P. Rhames, Austin, TX (US); Philip R. Riedel, Cary, NC (US); David L. Schmidt, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 124 days.

(21) Appl. No.: 14/569,698

(22) Filed: Dec. 13, 2014

(65) Prior Publication Data
US 2016/0173487 A1 Jun. 16, 2016

(51) Int. Cl.
H04L 29/06 (2006.01)

(52) U.S. Cl.
CPC ......... *H04L 63/0823* (2013.01); *H04L 63/102* (2013.01); *H04L 63/108* (2013.01)

(58) Field of Classification Search
CPC H04L 63/0823; H04L 63/108; H04L 63/102
See application file for complete search history.

(56) References Cited

U.S. PATENT DOCUMENTS

| | | | |
|---|---|---|---|
| 6,968,373 B1 * | 11/2005 | Norris ..................... G06F 21/10 709/223 |
| 7,860,983 B1 | 12/2010 | Mansfield et al. |
| 8,594,632 B1 | 11/2013 | Azizi et al. |
| 2007/0089111 A1 * | 4/2007 | Robinson ................ G06F 21/53 718/1 |
| 2009/0024994 A1 * | 1/2009 | Kannan ............... G06F 9/45533 718/1 |
| 2010/0071025 A1 * | 3/2010 | Devine ............... G06F 9/45558 726/1 |
| 2010/0107163 A1 * | 4/2010 | Lee ..................... G06F 9/45533 718/1 |
| 2011/0265077 A1 | 10/2011 | Collison et al. |
| 2012/0084769 A1 * | 4/2012 | Adi ........................... G06F 8/63 717/174 |
| 2013/0117676 A1 * | 5/2013 | De Pauw ................. G06F 3/00 715/738 |
| 2013/0227099 A1 | 8/2013 | Hinton et al. |
| 2014/0096134 A1 * | 4/2014 | Barak ................. G06F 9/45558 718/1 |
| 2015/0293756 A1 * | 10/2015 | Wright ................. G06F 21/577 717/178 |

OTHER PUBLICATIONS

Netto et al., Software Bundling Selection for Cloud Virtual Machine Images, May 2013, IEEE International Symposium on Integrated Network Management, pp. 575-581.*

Jacob et al, "IBM Tivoli Application Dependency Discovery Manager Capabilities and Best Practices", ibm.com/redbooks, Feb. 2008, 514 pages.

(Continued)

*Primary Examiner* — Kenneth Chang
(74) *Attorney, Agent, or Firm* — Amy J. Patillo

(57) ABSTRACT

A discovery bundle component is applied in a virtual image deployed within a virtual environment, wherein the discovery bundle automatically discovers asset information about one or more application bundles applied to the virtual image. The discovery bundle component sends, to a discovery product service, the asset information wrapped with a trusted signed certificate for the discovery product service, wherein the discovery product service is located outside the virtual environment.

17 Claims, 9 Drawing Sheets

(56) References Cited

OTHER PUBLICATIONS

Roberts, Matthew, Discovering ITM Agents without Credentials, accessed online via the Internet from <https://www.ibm.com/developerworks/community/wikis/home?lang=pt-br#!/wiki/Tivoli%20Application%20Dependency%20Discovery%20Manager/page/Discovering%20ITM%20Agents%20without%20Credentials> as of Nov. 17, 2014, 3 pages.

Kaseya, support, accessed online via the Internet from <http://www.kaseya.com/features/asset-management/discovery> as of Nov. 17, 2014, 4 pages.

* cited by examiner

CONTROLLING A DISCOVERY COMPONENT, WITHIN A VIRTUAL ENVIRONMENT, THAT SENDS AUTHENTICATED DATA TO A DISCOVERY ENGINE OUTSIDE THE VIRTUAL ENVIRONMENT

TECHNICAL FIELD

The embodiment of the invention relates generally to managing network systems and particularly to controlling a discovery component, applied within in a virtual environment, where the discovery component sends authenticated data to a discovery engine outside the virtual environment.

DESCRIPTION OF THE RELATED ART

Within a cloud environment, a virtual image is deployed by an appliance onto a virtual environment of a deployed system within the cloud environment.

BRIEF SUMMARY

There is a need for a method, system, and computer program product for discovery of asset information about deployed virtual images by an element other than the appliance that deploys the virtual images and for maintaining configuration management databases with asset information and synchronized with updates to the asset information in response to changes to deployed virtual images.

In one embodiment, a method for managing virtual image discovery is directed to applying, using one or more processors, a discovery bundle component in a virtual image deployed within a virtual environment, wherein the discovery bundle automatically discovers asset information about one or more application bundles applied to the virtual image. The method is directed to prompting, using the one or more processors, a user to provide an access control list specifying credentials for accessing one or more assets of the virtual image on a deployed system hosting the virtual environment. The method is directed to, in response to the user providing the access control list, storing, using the one or more processors, the access control list in a secured credential vault of the discovery bundle component. The method is directed to discovering, using the one or more processors, by the discovery bundle component, the asset information for a selection of at least one of the one or more application bundles applied to the virtual image, wherein the access control list comprises the credentials required for accessing the selection of at least one of the one or more application bundles to discover the asset information. The method is directed to sending, using the one or more processors, by the discovery bundle component, to a discovery product service, the asset information wrapped with a trusted signed certificate for the discovery product service, without sending the credentials used to access the asset information to the discovery product service, wherein the discovery product service is located outside the virtual environment.

In another embodiment, a system for managing virtual image discovery, comprising a processor, coupled with a memory, and configured to perform the actions of applying a discovery bundle component in a virtual image deployed within a virtual environment, wherein the discovery bundle component automatically discovers asset information about one or more application bundles applied to the virtual image. The processor is configured to perform the actions of prompting a user to provide an access control list specifying credentials for accessing one or more assets of the virtual image on a deployed system hosting the virtual environment. The processor is configured to perform the actions of, in response to the user providing the access control list, storing the access control list in a secured credential vault of the discovery bundle component. The processor is configured to perform the actions of discovering, by the discovery bundle component, the asset information for a selection of at least one of the one or more application bundles applied to the virtual image, wherein the access control list comprises the credentials required for accessing the selection of at least one of the one or more application bundles to discover the asset information. The processor is configured to perform the actions of sending, by the discovery bundle component, to a discovery product service, the asset information wrapped with a trusted signed certificate for the discovery product service, without sending the credentials used to access the asset information to the discovery product service, wherein the discovery product service is located outside the virtual environment.

In another embodiment, a computer program product for managing virtual image discovery. The computer program product comprises a non-transitory computer readable storage medium having program instructions embodied therewith. The program instructions are executable by a processor to cause the processor to apply a discovery bundle component in a virtual image deployed within a virtual environment, wherein the discovery bundle component automatically discovers asset information about one or more application bundles applied to the virtual image. The program instructions are executable by a processor to cause the processor to prompt a user to provide an access control list specifying credentials for accessing one or more assets of the virtual image on a deployed system hosting the virtual environment. The program instructions are executable by a processor to cause the processor to, in response to the user providing the access control list, store the access control list in a secured credential vault of the discovery bundle component. The program instructions are executable by a processor to cause the processor to discover, by the discovery bundle component, the asset information for a selection of at least one of the one or more application bundles applied to the virtual image, wherein the access control list comprises the credentials required for accessing the selection of at least one of the one or more application bundles to discover the asset information. The program instructions are executable by a processor to cause the processor to send, by the discovery bundle component, to a discovery product service, the asset information wrapped with a trusted signed certificate for the discovery product service, without sending the credentials used to access the asset information to the discovery product service, wherein the discovery product service is located outside the virtual environment.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
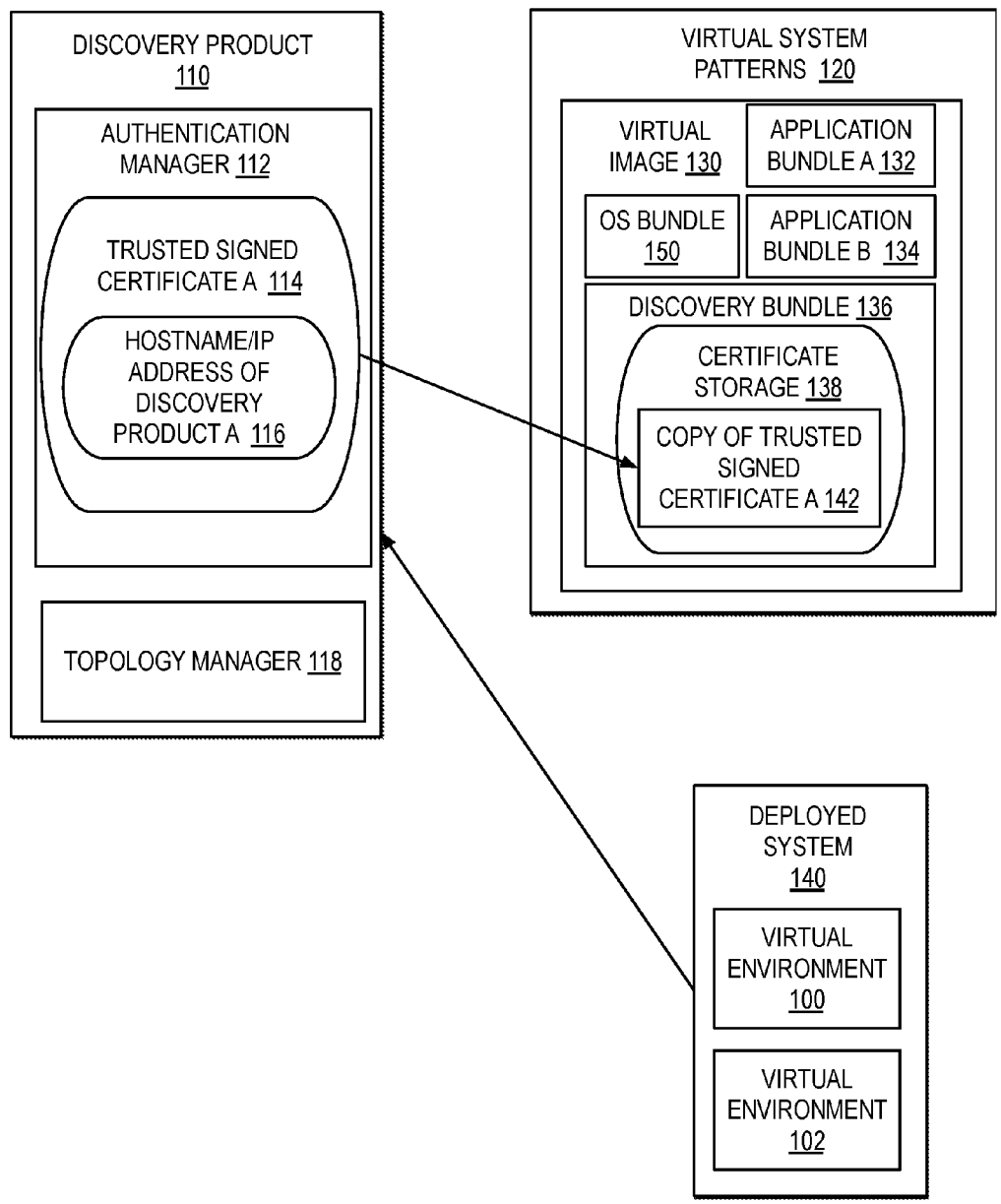
FIG. 1 illustrates one example of block diagram of a discovery bundle created for application within a virtual image deployed within a virtual environment, which is configured for reporting discovered asset information about the deployed virtual image to a discovery product outside the virtual environment, when the discovery bundle is deployed.

FIG. 1 illustrates a block diagram of one example of a discovery bundle created for application within a virtual image deployed within a virtual environment, which is configured for reporting discovered asset information about the deployed virtual image to a discovery product outside the virtual environment, when the discovery bundle is deployed.

In one example, a discovery product 110 may represent a service or other type of component for automated discovery and application mapping of a complex application infrastructure of virtual environments on deployed systems, such as a deployed system 140. In one example, multiple virtual environments may be deployed on deployed system 140, such as virtual environment 100 and virtual environment 102. In one example, each of virtual environment 100 and virtual environment 102 may represent one or more types of virtualized resources including, but not limited to, a virtual machine (VM), a logical partition (LPAR), and a workload partition (WPAR). In one example, discovery product 110 executes outside of virtual environment 100 and virtual environment 102. In one example, discovery product 110 is communicatively connected with deployed system 140 via one or more network layer connections. In one example, one or more of discovery product 110 and deployed system 140 are deployed within a cloud environment.

In one example, discovery product 110 may include an authentication manager 112 for distributing a trusted signed certificate A 114 and for authenticating communications received by discovery product 110 that include trusted signed certificate A 114. In one example, as illustrated at reference numeral 116, trusted signed certificate A 114 may include a hostname and internet protocol (IP) address of discovery product 110. In additional or alternate embodiments, trusted signed certificate A 114 may include additional or alternate types of identifying asset information and may implement one or more types of trusted signature protocols to generate and authenticate trusted signed certificate A 114. In additional or alternate embodiments, authentication manager 112 may manage multiple trusted signed certificates and may manage additional authentication functions.

In one example, discovery product 110 may include a topology manager 118 for managing a structure, status, configuration, and change history of interdependent applications on deployed systems within cloud environment 100. In one example, topology manager 118 may manage discovery and generation of a shared topological view of applications for use by other management applications including, but not limited to, incident management tools, monitoring tools, and provisioning tools. In one example, topology manager 118 may organize and report data to a configuration management database (CMDB), which may include a repository that may hold a collection of information technology (IT) assets, such as products, systems, software, and facilities, as well as descriptive relationships between the assets, to enable an organization to understand the relationships between currently deployed systems and to track configurations of the deployed systems. In one example, a CMDB may be organized and managed according to Information Technology Infrastructure Library (ITIL), a set of practices for IT service management (ITSM). In another example, a CMDB or other database in which information technology asset information is organized, may be organized and managed according to additional or alternate standards and practices.

In one example, a user may select to configure one or more virtual system patterns 120, preconfigured or on-demand upon deployment, where each virtual system pattern may be a topology definition for repeatable deployment on systems within a cloud environment, such as deployed system 140. In one example, a virtual system pattern within virtual system patterns 120 may represent one or more virtual images, such as virtual image 130. Virtual image 130 may be preconfigured or may be configured on-demand, upon deployment to a virtual environment of a deployed system within a cloud environment, such as virtual environment 100 or virtual environment 102 of deployed system 140. In one example, an instance of virtual image 130 may be deployed to virtual environment 100 and other instance of virtual image 130 may be deployed to virtual environment 102.

In one example, virtual system patterns 120 may include one or more types of bundles that can be applied to multiple virtual images that are deployed to a virtual environment of a deployed system, such as deployment to virtual environment 100 or virtual environment 102. In one example, the types of bundles that may be applied to virtual images may include, but are not limited to, operating system bundles and application bundles. In one example, virtual image 130 is preconfigured with an operating system (OS) bundle 150, which controls the operating system layer to be executed for virtual image 130 when deployed. In one example, virtual image 130 is preconfigured with one or more application bundles may include one or more types of applications configured for application to a deployed virtual image to specify the deployment topology, such as an application bundle A 132, an application bundle B 134, and a discovery bundle 136. In one example, the topology parts of a virtual system pattern may be defined by virtual images, add-ons, and applications. In one example, a virtual system pattern may represent a middleware environment, and may represent a unit of deployment to a virtual environment of a deployed system. In one example, an application bundle may represent a configured instance of an application for banking into a virtual image deployed within a deployed system of a cloud environment. In one example, an application bundle may represent one or more applications and types of applications. For example, an application bundle may include an application service for performing a specific application and may include a database service for providing a database service for the hosted applications.

In one example, each bundle specified within virtual image 130 may include multiple variables that are selectable and configurable by a user. Each of the variables may be further specified according to one or more restrictions including, but not limited to, whether the variables are required to be set by the user during preconfiguration of the bundles within virtual image 130, whether the variables are required to be set by a user upon deployment of virtual image 130 to a particular virtual environment, whether the variables may be set in both during preconfiguration and after deployment, and whether the user may select a default setting for a variable. In one example, if a variable is specified as being required to be set by the user during preconfiguration of the bundles within virtual image 130, through one or more interfaces, the user may be prompted to specify the required variable when the user selects to place the bundle in virtual image 130. In one example, if a user does not specify a particular variable that is required to be set during configuration and the user is allowed to select a default, a default setting for a variable is automatically selected. In one example, if a user does not specify a particular variable that is required to be set during preconfiguration within virtual image 130, and the user is not allowed to select a default mode, virtual image 130, virtual image 130 may be blocked from deployment.

In one example, discovery bundle 136 may represent an application instance specified in a virtual system pattern for application to a virtual image deployed within a virtual environment of a deployed system for managing asset information discovery and reporting. In one example, a certificate storage 138 of discovery bundle 136 may represent one of the variables of discovery bundle 136 that is required to be configured prior to deployment with one or more trusted signed certificates identifying one or more discovery products. In one example, certificate storage 138 is configured, prior to deployment, with copy of trusted signed certificate A 142, which is a copy of trusted signed certificate A 114 of discovery product 110. In one example, when discovery bundle 136 is configured in virtual image 130 and virtual image 130 is deployed in a virtual environment, such as virtual environment 100 or virtual environment 102, discovery bundle 136 selectively reports asset information about one or more application layers of the virtual environment on which virtual image 130 is deployed to one or more specific discovery products specified in certificate storage 138. In one example, asset information may include detailed information including, but not limited to, file system information, device information, operating system information, database information, log devices information, and message queue information.

In one example, discovery bundle 136 may include certificate storage 138 in which a user may select which discovery products to report asset information to by selecting to store a trusted signed certificate for each selected discovery product in certificate storage 138 when configuring discovery bundle 136. In one example, discovery product 110 may automatically distribute trusted signed certificate A 114 across a network monitored by discovery product 110, where a system on which virtual system patterns 120 are configured may detect trusted signed certificate A 114 and prompt a user to select whether to include trusted signed certificate A 114 in certificate storage 138 as copy of trusted signed certificate A 142. In another example, certificate storage 138 of discovery bundle 136 may be preconfigured with an initial address for sending a request to authentication manager 112 to request a copy of trusted signed certificate A 114, wherein authentication manager 112 may respond to authorized requests to the initial address with trusted signed certificate A 114 for storage in certificate storage 138 as copy of trusted signed certificate A 142. In additional or alternate embodiments, trusted signed certificate A 114 may be accessed from or distributed by authentication manager 112 through additional or alternate requests. In additional or alternate embodiments, certificate storage 138 of discovery bundle 136 may be configured with copies of trusted signed certificates from multiple discovery products.

While a deployed system may be aware of each deployed virtual image on the deployed system, discovery product 110 may not be not aware of each virtual image without some type of discovery. In the example illustrated in FIG. 1, discovery bundle 136, once deployed in a virtual image in a virtual environment of deployed system 140, may make discovery product 110 aware of the deployed virtual image. In the example, while discovery product 110 may include components that enable discovery product 110 to scan ports or scrape through process lists of deployed systems in a cloud environment to try to discover information about deployed system 140, scanning ports or scraping of process lists provides a minimal level of detail about deployed systems and does not provide the type of detailed asset information discoverable and reportable by discovery bundle 136 about virtual images deployed within deployed system 140. The detailed asset information discoverable and reportable by discovery bundle 136 may include the interconnected nature and internal configuration of databases, middleware, and other servers included in application bundles applied to virtual images deployed within virtual environments of deployed systems in the cloud environment. In one example, the type of asset information discoverable by discovery bundle 136 about virtual images deployed within virtual environments of deployed systems in the cloud environment, and reported to discovery product 110, is at a level of detail that allows topology manager 118 of discovery product 110 to use the asset information reported by discovery bundle 136 to maintain or update a configuration management database according to ITIL terms with the complex application infrastructure of each virtual image deployed in a virtual environment.

In the example, because certificate storage 138 of discovery bundle 136 may be configured with copy of trusted signed certificate A 142, prior to deployment of discovery bundle 136 within a virtual image on a particular virtual environment of a deployed system, users do not need to program discovery product 110 with the locations of virtual images deployed within virtual environments and discovery product 110 does not need to search virtual environment 100 to attempt to discover virtual images deployed on deployed systems. In one example, within a cloud environment, the deployment of virtual images on deployed systems may change rapidly, such that even if users directly feed location information about deployed virtual images to discovery product 110, the virtual image may be provided for such a limited period of time that the discovery product may not have enough time to locate and discover asset information about the deployed virtual image. In one example, a user may select which discovery product the user would like to report asset information to about virtual image deployed and the user may preconfigure discovery bundle 136 to be deployed with the virtual image and to include copy of trusted signed certificate A 142 for directing discovery bundle 136 to report to selected discovery product 110 for application within virtual image 130, independent of any particular system onto which virtual image 130 is deployed. Separate instances of virtual image 130 may be deployed within multiple virtual environments where each deployed instance of virtual image 130 may apply an instance of discovery bundle 136 with copy of trusted signed certificate A 142 applied in each instance of discovery bundle 136. In one example, once discovery bundle 136 is deployed with an instance of virtual image 130 to a virtual environment of deployed system 140, with copy of trusted signed certificate A 142 configured in certificate storage 138, discovery bundle 136 may discover asset information about virtual image 130 as deployed and report the discovered asset information to discovery product 110, without requiring discovery product 110 to first discover virtual image as deployed on deployed system 140.

Figure 2:
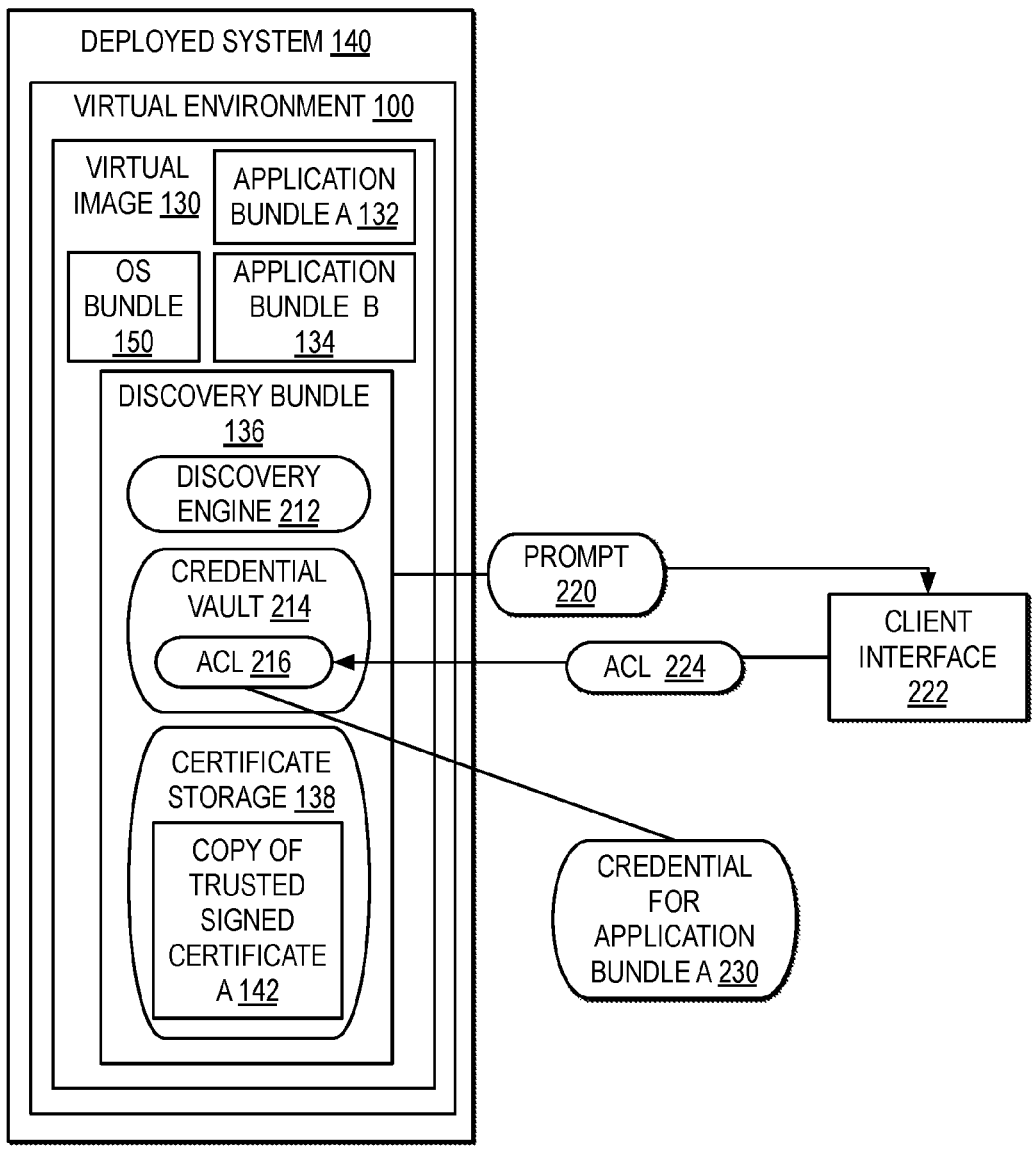
FIG. 2 illustrates one example of a block diagram of a discovery bundle, applied within a virtual image deployed within a virtual environment of a deployed system, requesting user specification of which elements of a deployed system to report to one or more discovery products.

FIG. 2 illustrates one example of a block diagram of a discovery bundle, applied within a virtual image deployed within a virtual environment of a deployed system, requesting user specification of which elements of a deployed system to report to one or more discovery products.

In one example, an instance of virtual image 130 is deployed from virtual system patterns 120 to virtual environment 100 of deployed system 140 with instances of OS bundle 150, application bundle A 132, application B 134, and discovery bundle 136 attached to virtual image 130 when deployed. In another example, an additional instance of virtual image 130 or another virtual system pattern may be deployed to additional virtual environments on deployed system 140.

In one example, discovery bundle 136 includes certificate storage 138, with a copy of trusted signed certificate A 142, as preconfigured into discovery bundle 136 from trusted signed certificate A 114 from discovery product 110. In addition, as illustrated, discovery bundle 136 may include additional components including, but not limited to, a discovery engine 212 and a credential vault 214.

In one example, discovery engine 212 is an instance of a hermetic discovery application of discovery bundle 136, applied within virtual image 130, that discovers asset information about one or more application layers of virtual image 130 on deployed system 140, using credentials granted within credential vault 214, and provides the discovered asset information to one or more discovery products without disclosing the credentials held in credential vault 214 that are used to discover the asset information. For example, credentials vault 214 may include permissions that allow for discovery engine 212 to report asset information about a selection of application layers and a selection of applications within each layer. In the example, credential vault 214 may include one or more layers of security protocols for securing the permissions specified in credential vault 214 to prohibit unauthorized accesses or uses of the permissions. In the example, the hermetic characteristic of discovery bundle 136 requires that the credentials of ACL 216 remain in virtual image 130 and do not get passed to discovery product 110.

In one example, credential vault 214 may be a variable of discovery bundle 136 that may be preconfigured prior to deployment of virtual image 130 with an access control list (ACL) 216 specifying a selection of asset information discoverable about virtual image 130 that may be reported. In addition, ACL 216 may include one or more credentials for use by discovery engine 212 required to access one or more of the bundles of virtual image 130, if reporting about the one or more bundles of virtual image 130 is permitted by ACL 216.

In another example, discovery bundle 136, when deployed with virtual image 130, may include variables that may be configurable prior to deployment of virtual image 130 and may be configurable upon deployment by soliciting a user to configure the variables at the time of deployment. Examples of variables of discovery bundle 136 that may be set as configurable by a user including, but are not limited to, the types of asset information to be discovered and reported as specified by the settings in ACL 216, the initial time window for reporting an initial discovery report from discovery bundle 136 to discovery product 110, a delta time for reporting an delta discovery reports with any updated asset information to discovery product 110, and the type of updated asset information to be reported in a delta discovery report.

In one example, ACL 216 may be set as a variable to be solicited at the time of deployment of discovery bundle 136. In one example, soliciting the variable for ACL 216 may include prompting a user to select to configure discovery bundle 136 by providing an access control list with credentials. For example, discovery bundle 136 may send a prompt 220 to a client interface 222, where prompt 220 includes a request for a user to specify an access control list with any required credentials for application by discovery bundle 136. In one example, client interface 222 may represent an administrator interface for a user that manages deployed system 140. In one example, a user or an automated client on client interface 222 may select an access control list with credentials and return the access control list with credentials as ACL 224. Discovery bundle 136 stores ACL 224 as ACL 216 in credential vault 214. In one example, ACL 224 may override a default ACL as ACL 216. In another example, ACL 224 may supplement a default ACL as ACL 216.

In one example, ACL 216 may be configured in credential vault 214 to all for accessing to general deployed system characteristics that do not require credentials to access and include a credential for application bundle A 230 for required for access by discovery bundle 136 to application bundle A 132. In one example, credential for application bundle A 230 may be further specified to allow access to particular types of asset information included in application bundle A 230. For example, credential for application bundle A 230 may be specified to allow access to particular types of asset information about the applications and underlying application servers that host the applications within application bundle A 132, but may not permit access to any information about the operating system hosted by the bundle. In the example, based on the credentials specified in ACL 216, discovery engine 212 is provided with permissions that allow for discovery and reporting of asset information about application bundle A 132, but discovery engine 212 is not provided with permissions for discovering or reporting that OS bundle 150 or application bundle B 134 are present in virtual image 130 deployed on deployed system 140. In one example, application bundle B 134 may represent a database for storing a type of confidential data, such as a database for storing health data, where the user does not want to provide any information about the database to discovery product 110 and therefore the user does not provide a credential for application bundle B 134 in ACL 216.

In one example, by allowing a user to select to add discovery bundle 136 to a deployed virtual image, a user may select to control the asset information reported to a discovery product. By allowing the user to select to add credentials to credential vault 214, the user is provided with further control over the security of the level and type of detail of asset information about a deployed virtual image that is discoverable and reportable by discovery bundle 136. A user may provide discovery bundle 136 with the credentials required to control a selection of detailed asset information about virtual image 130 that discovery engine 212 discovers using the credentials, to enable reporting of detailed asset information about virtual image 130 to discovery product 110 without requiring the user to provide the credentials for accessing applications within virtual image 130 to discovery product 110. In one example, a user may want to maintain the security of credentials that can be used to access application bundles and would not want to distribute the credentials to any services, such as discovery product 110, that are not fully within the control of the user.

Figure 3:
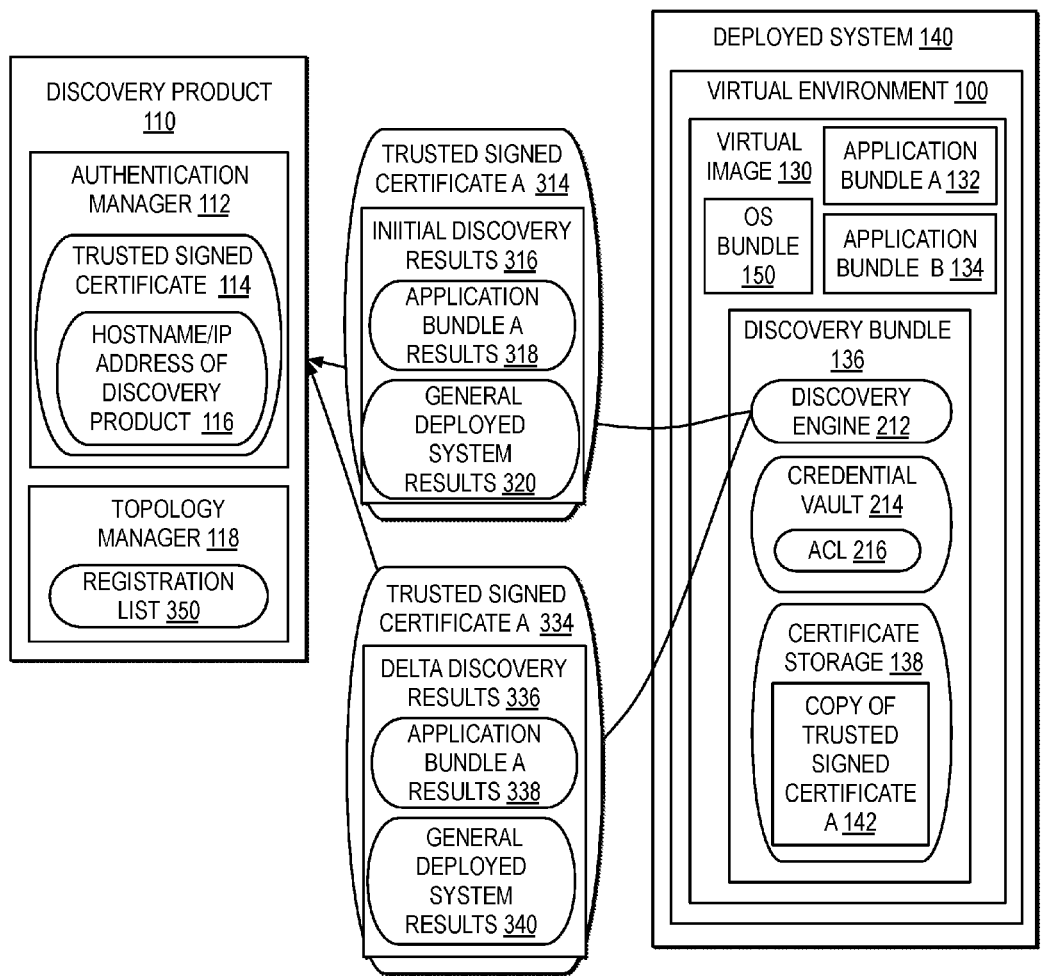
FIG. 3 illustrates one example of a block diagram of a discovery bundle, applied to a virtual image deployed within a virtual environment of a deployed system, selectively discovering asset information about the virtual image on the deployed system and reporting the asset information in a discovery report, wrapped in a trusted signed certificate, to a selected discovery product.

FIG. 3 illustrates one example of a block diagram of a discovery bundle, applied to a virtual image deployed within a virtual environment of a deployed system, selectively discovering asset information about the virtual image on the deployed system and reporting the asset information in a discovery report, wrapped in a trusted signed certificate, to a selected discovery product.

In one example, discovery engine 212 automatically starts running when virtual image 130 is deployed in virtual environment 100. In one example, discovery engine 212 provides a method for using credentials in ACL 216 to discover asset information about virtual image 130 and report the asset information to discovery product 110, without exposing the credentials in ACL 216 to discovery product 110. In the example, upon deployment, discovery engine 212 collects an initial set of asset information, using ACL 216, illustrated as initial discovery results 316. In one example, if ACL 216 includes credential for application bundle A 230, as illustrated in FIG. 2, then initial discovery results 316 may include application bundle A results 318 accessed using credential for application bundle A 230. In addition, initial discovery results 316 may include asset information about deployed system 140 or virtual environment 100 that do not require a particular credential for discovery engine 212 to discover, illustrated by general deployed system results 320.

In one example, discovery engine 212 wraps initial discovery results 316 in a trusted signed certificate A 314 based on copy of trusted signed certificate A 142, and sends trusted signed certificate A 314 to discovery product 110. In one example, authentication manager 112 of discovery product 110 may authenticate trusted signed certificate A 314 against trusted signed certificate 114 and if trusted signed certificate A 314 passes, store initial discovery results in a registration list 350 of topology manager 118. In one example, in addition to wrapping initial discovery results 316 in trusted signed certificate A 314, discovery engine 212 may add an additional signed certificate identifying discovery bundle 136.

In one example, discovery engine 212 is set to periodically check for updates to the asset information for virtual image 130. In one example, a delta time variable may be preconfigured in discovery engine 212 or a user may be prompted to set the delta time variable when discovery bundle 136 is deployed with virtual image 130. In one example, for each delta time, discovery engine 212 checks for updates to the asset information for virtual image 130 and reports the updates in delta discovery results 336. In one example, delta discovery results 336 may include application bundle A results 338 with updates to the asset information for application bundle A 132 and general deployed system results 340 with updates to the asset information discoverable about deployed system 140 without requiring a credential. In the example, discovery engine 212 may wrap delta discovery results 336 in trusted signed certificate A 334, based on copy of trusted signed certificate A 142, and sends trusted signed certificate A 334 to discovery product 110.

In the example, while prior to deployment discovery bundle 136 may be initially configured with copy of trusted signed certificate A 142, received from discovery product 110, once discovery bundle 136 is deployed, the communication from discovery bundle 136 to discovery product 110 is illustrated as a one-way communication from discovery bundle 136 to discovery product 110. In the example, once discovery product 110 receives initial discovery results 316, topology manager 118 may log a record for discovery bundle 136 in registration list 350 and monitor whether delta discovery results 336 are received from discovery bundle 136 within a delta time period. In the example, each time topology manager 118 receives a delta discovery result update from discovery bundle 136, topology manager 118 resets a timer for tracking for a next delta time period for discovery bundle 136. In the example, if topology manager 118 does not receive a delta discovery result update from discovery bundle 136 within the delta time period, topology manager 118 may automatically determine that virtual image 130 is no longer actively deployed and stop tracking for delta discovery results updates from discovery bundle 136. In the example, by discovery bundle 136 sending discovery product 110 initial discovery results 316 and then sending delta discovery results 336 for each delta time period that virtual image 130 is active, and by discovery product 110 monitoring for delta discovery results during each delta time period after initial discovery results 316 are received, discovery product 110 is able to maintain real-time, current asset information about active virtual images deployed within a cloud environment from one-way communications from discovery bundles applied to active virtual images. By minimizing the communication between discovery bundle 136 and discovery product 110 to one-way communications from discovery bundle 136 to discovery product 110, using communications wrapped with trusted signed certificates, discovery product 110 may receive asset information and compile the asset information into a CMDB under ITIL terms without having to use any outbound bandwidth discovering or polling deployed systems for information about virtual images.

In one example, to improve efficiency of the one-way communications between discovery bundle 136 and discovery product 110, discovery engine 212 may request a well known port of deployed system 140 that is not normally blocked for sending trusted signed certificate A 314 and trusted signed certificate A 334 to discovery product 110. In another example, discovery engine 212 may negotiate for additional or alternate types of ports for sending discovery results to discovery product 110.

In the example, by automating the discovery and sending of initial discovery results 316 and one or more delta discovery results 336 at each delta time period, by discovery bundles across multiple deployed systems to discovery product 110, discovery product 110 is enabled to quickly register the active, currently deployed virtual images in a cloud environment and to monitor any changes to the asset information on registered virtual images in order to maintain a CMDB that is synchronized with the transient changes to virtual images within a cloud environment. In a cloud environment where discovery product 110 may receive a large volume of registrations of virtual images in a short period of time, and where many of the virtual images may be active for short periods of time, placing the burden of discovery and reporting to the discovery bundle deployed with other applications bundles to a virtual image improves the efficiency of discovery product 110 receiving asset information from multiple virtual images and of discovery product 110 maintaining current asset information in CMDB. In addition, by placing the permissions for discovery of asset information in the discovery bundle, the owner of credentials required for asset information discovery retains secure control of the credentials within discovery bundles deployed by the owner and the owner may also selectively control which types of asset information are reportable to discovery product 110.

Figure 4:
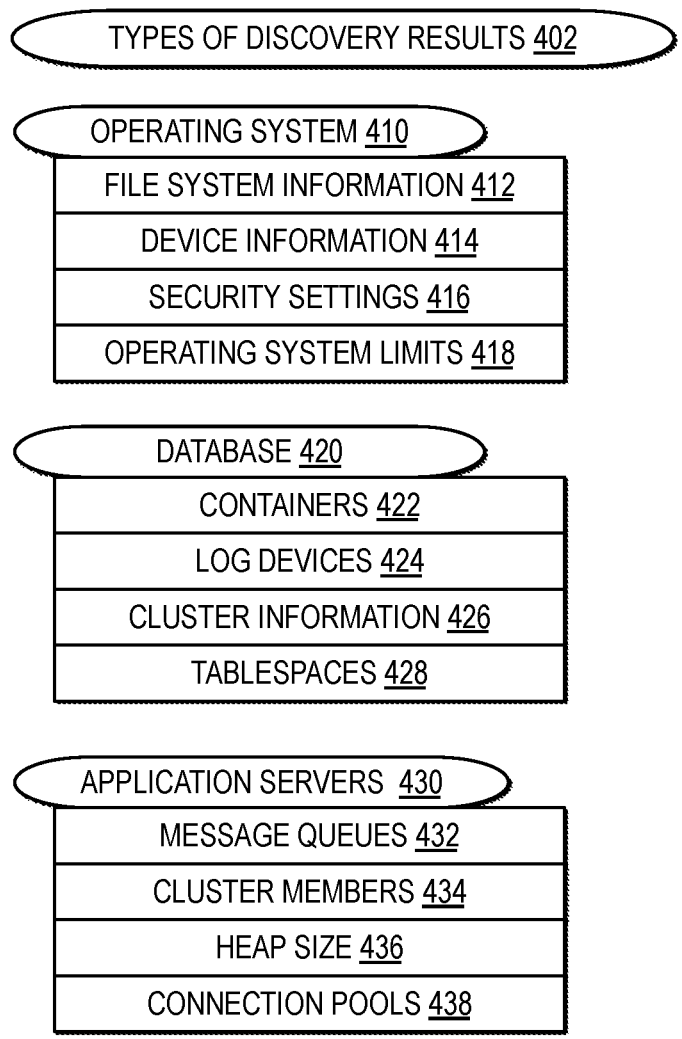
FIG. 4 illustrates one example of a block diagram of types of asset information a discovery bundle may discover about a virtual image deployed on a system within a virtual environment, according to the credentials held by the discovery bundle applied within the virtual image, and may report to a discovery product outside the virtual environment.

FIG. 4 illustrates one example of a block diagram of types of asset information a discovery bundle may discover about a virtual image deployed on a system within a virtual environment, according to the credentials held by the discovery bundle applied within the virtual image, and may report to a discovery product outside the virtual environment.

In one example, discovery engine 212 may discover multiple types of asset information about multiple software layers that may run a virtual image deployed onto a deployed system in a virtual environment. In one example, as illustrated at reference numeral 402, multiple types of discovery results may include types of results categorized by type of software layer, where the software layers may include, but are not limited to an operating system 410, a database 420, and application servers 430.

In one example, for an operating system bundle applied to a virtual image deployed in a virtual environment, types of results under operating system 410 may include, but are not limited to, file system information 412, device information 414, security settings 416, and operating system limits 418. In one example, operating system limits 418 may include limits such as, but not limited to, "/etc/security/limits" or "limits.conf". In one example, ACL 216 of credential vault 214 may be loaded with credentials specifying the access allowed to one or more of the types of results under operating system 410. In additional or alternate embodiments, types of operations under operating system 410 may include additional or alternate types of operating system characteristics.

In one example, for a database accessed by a virtual image deployed in a virtual environment, types of results under database 420 may include, but are not limited to, containers 422, log devices 424, cluster information 426, and tablespaces 428. In one example, ACL 216 of credential vault 214 may be loaded with credentials specifying the access allowed to one or more types of results under database 420. In additional or alternate embodiments, types of operations under database 420 may include additional or alternate types of database characteristics.

In one example, for application servers accessed by a virtual image deployed in a virtual environment to execute application bundles and perform other application functions, types of results under application servers 430 may include, but are not limited to, message queues 432, cluster members 434, heap size 436, and connection pools 438. In one example, ACL 216 of credential vault 214 may be loaded with credential specifying the access allowed to one or more types of results under application servers 430. In additional or alternate embodiments, types of operations under application servers 430 may include additional or alternate types of application server characteristics.

In the example, as illustrated at reference numeral 402, the detail and granularity of asset information accessible and reportable by discovery engine 212 as discovery results includes more than the type of information that may be generally known and reported by an underlying deployed system, such as an operating system and version of the operating system running on the deployed system, disk space required for a virtual image, CPUs available on the deployed system, and memory available on the deployed system. The types of discovery results reportable by discovery engine 212, as selectively accessed using credentials specified in ACL 216, may include information about the topology and interconnections of the application bundles applied to a deployed virtual image.

It is understood in advance that although this disclosure includes a detailed description of an implementation within a cloud computing environment, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
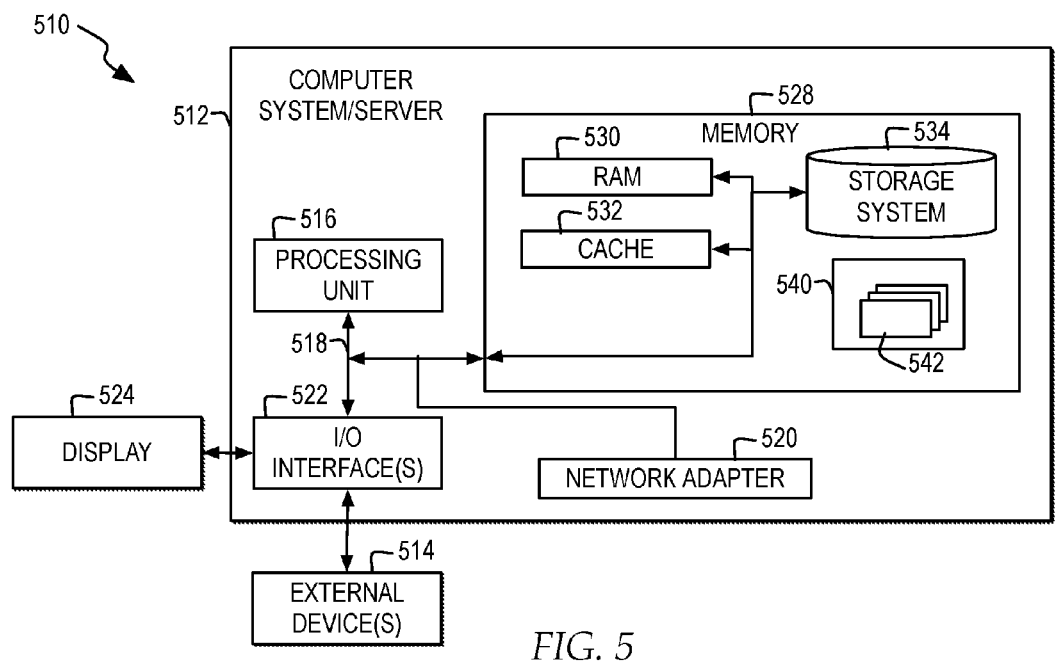
FIG. 5 illustrates one example of a block diagram of a cloud computing node, which may be implemented in a cloud computing environment.

Referring now to FIG. 5, FIG. 5 illustrates one example of a block diagram of a cloud computing node, which may be implemented in a cloud computing environment. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 30 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
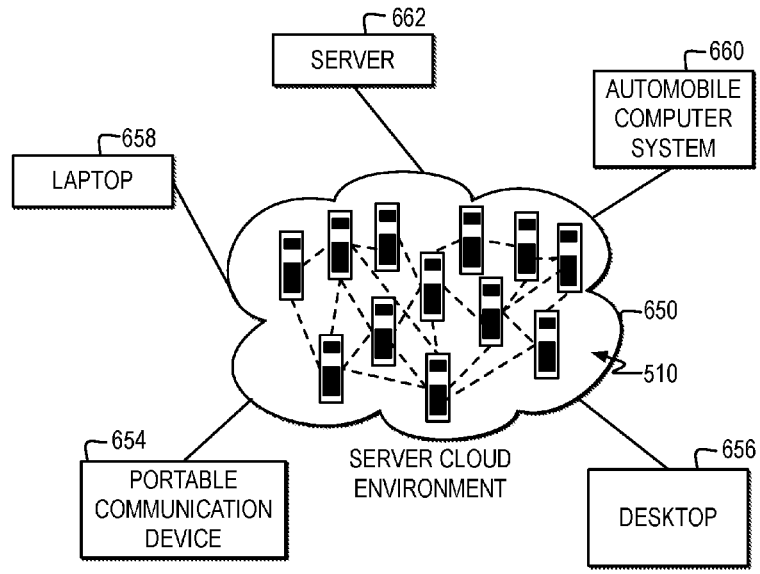
FIG. 6 illustrates one example of a block diagram of a cloud computing environment.

FIG. 6 illustrates a block diagram of one example of a cloud computing environment. In one example, a cloud computing environment 650 is representative of cloud environment 350. As shown, cloud computing environment 650 comprises one or more cloud computing nodes 510 with which local computing devices used by cloud consumers, such as, for example, personal communication device 654, which may include, but is not limited to, a personal digital assistant (PDA) or cellular telephone, a desktop computer 656, a laptop computer 658, automobile computer system 660, and server 662 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices shown in FIG. 6 are intended to be illustrative only and that computing nodes 510 and cloud computing environment 650 can communicate with any type of computerized device over any type of network and/or network addressable connection (e.g., using a web browser).

Figure 7:
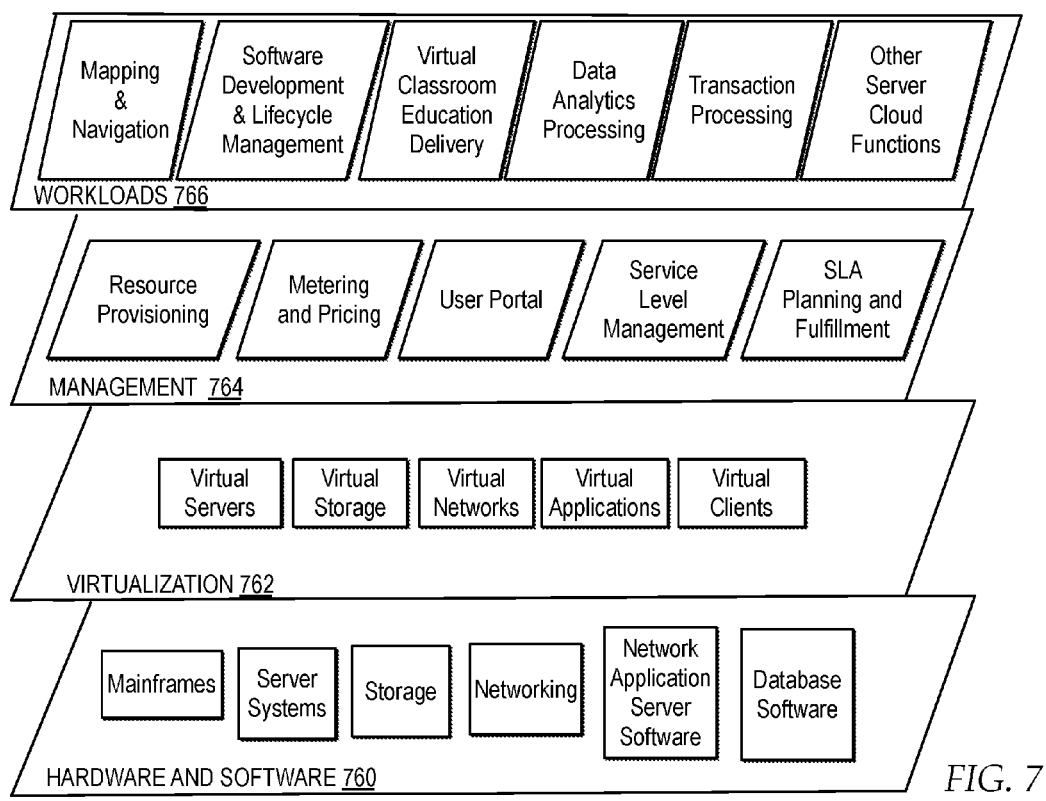
FIG. 7 illustrates one example of a block diagram of a set of functional abstraction layers provided by a cloud computing environment.

FIG. 7 illustrates a block diagram of one example of a set of functional abstraction layers provided by a cloud computing environment. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes; RISC (Reduced Instruction Set Computer) architecture based servers; storage devices; networks and networking components. In some embodiments, software components include network application server software.

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide one or more functions including, but not limited to, resource provisions, metering and pricing, user portal, security, service level management, and SLA planning and fulfillment. Resource provisioning may provide dynamic procurement of computing resources and other resources that are utilized to perform tasks within the cloud computing environment. Metering and Pricing may provide cost tracking as resources are utilized within the cloud computing environment, and billing or invoicing for consumption of these resources. In one example, these resources may comprise application software licenses. Security may provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which cloud computing environment 650 may be utilized. Examples of workloads and functions which may be provided from this layer may include, but are not limited to: mapping and navigation; software development and lifecycle management; virtual classroom education delivery; data analytics processing; transaction processing; and other server cloud functions. In one example, the other server cloud functions may include, but are not limited to, providing a discovery bundle for application in a virtual image deployed within a cloud environment where the discovery bundle discovers asset information about a virtual image, as permitted by credentials configured in the discovery bundle, and periodically reports the asset information, wrapped with a trusted signed certificate of a discovery product, to the discovery product outside of a virtual environment of the virtual image. Other server cloud functions may include one or more of the functions of discovery product 110, virtual image 130, OS bundle 150, application bundle A 132, application bundle B 134, and discovery bundle 136.

Figure 8:
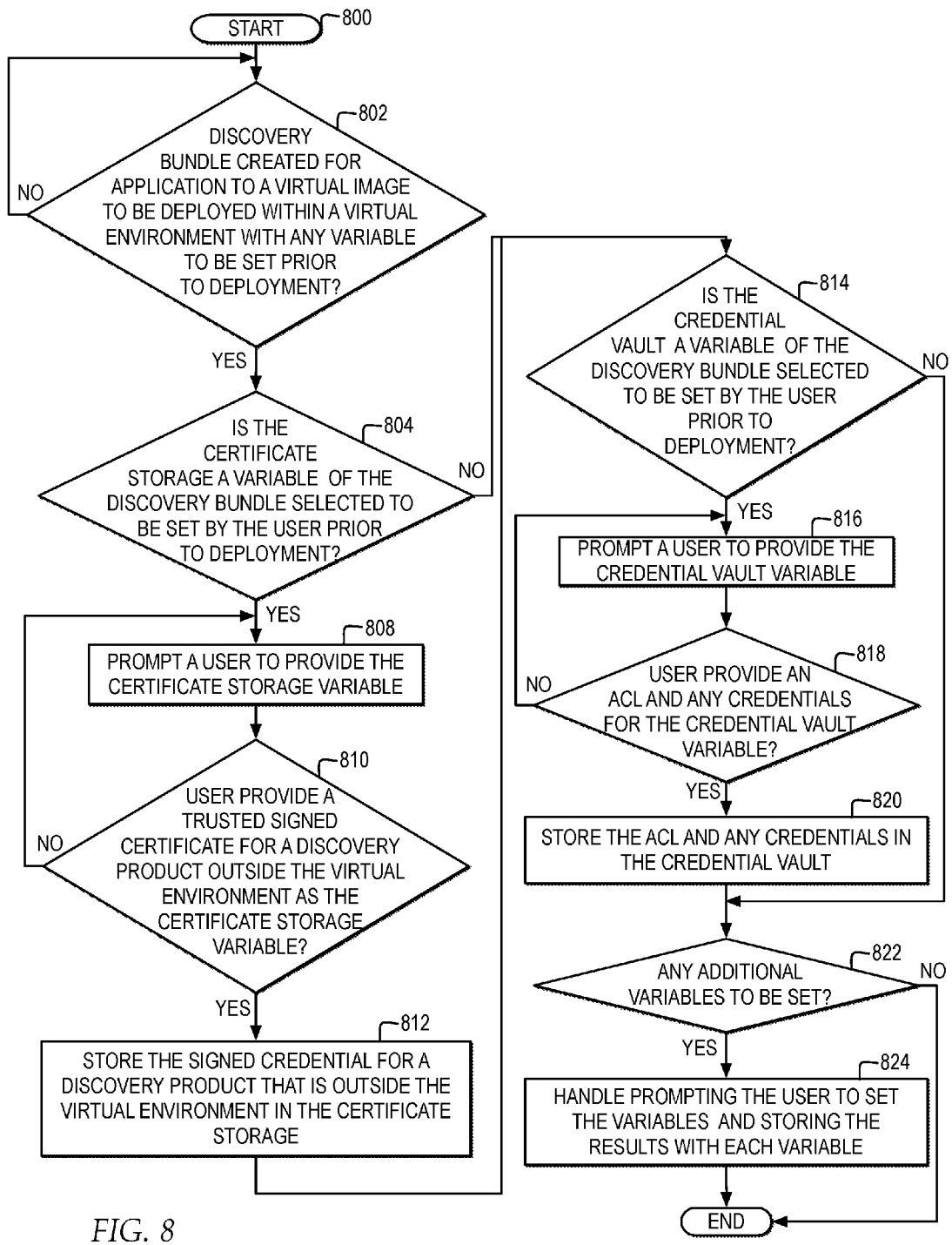
FIG. 8 illustrates a high level logic flowchart of a process and computer program for configuring a discovery bundle created for application within an virtual image to be deployed within a virtual environment.

FIG. 8 illustrates a high level logic flowchart of a process and computer program product for configuring a discovery bundle created for application within an virtual image to be deployed within a virtual environment.

In one example, the process and program starts at block 800 and thereafter proceeds to block 802. Block 802 illustrates a determination whether a discovery bundle is created for application to a virtual image to be deployed within a virtual environment with any variables to set prior to deployment. At block 802, if a discovery bundle is created for application to a virtual image to be deployed within a virtual environment with any variables to set prior to deployment, then the process passes to block 804. Block 804 illustrates a determination whether the certificate storage is a variable of the discovery bundle selected to be set by the user prior to deployment. At block 804, if the certificate storage is a variable of the discovery bundle selected to be set by the user prior to deployment, then the process passes to block 808. Block 808 illustrates prompting a user to provide the certificate storage variable through an interface. Next, block 810 illustrates a determination whether the user provides a trusted signed certificate for a discovery product outside the virtual environment as the certificate storage variable. At block 810, if the user does not user provide a trusted signed certificate for a discovery product outside the virtual environment as the certificate storage variable, then the process returns to block 808. At block 810, if the user provides a trusted signed certificate for a discovery product outside the virtual environment as the certificate storage variable, then the process passes to block 812. Block 812 illustrates storing the signed credential for a discovery product that is outside the virtual environment in the certificate storage, and the process passes to block 814.

Returning block 804, if the certificate storage is not variable of the discovery bundle selected to be set by the user prior to deployment, then the process passes to block 814. Block 814 illustrates a determination whether the credential vault is a variable of the discovery bundle selected to be set by the user prior to deployment. At block 814, if the credential vault is a variable of the discovery bundle selected to be set by the user prior to deployment, then the process passes to block 816. Block 816 illustrates prompting a user to provide the credential vault variable. Next, block 818 illustrates a determination whether the user provides an access control list (ACL) and any credentials for the credential vault variable. At block 818, if the user does not provide an ACL and any credentials for the credential vault variable, then the process returns to block 816. At block 818, if the user provides an ACL and any credentials for the credential vault variable, then the process returns to block 820. Block 820 illustrates storing the ACL and any credentials in the credential vault, and the process passes to block 822.

Returning to block 814, if the credential vault is not a variable of the discovery bundle selected to be set by the user prior to deployment, then the process passes to block 822. Block 822 illustrates a determination whether there are any additional variables to be set prior to deployment. For example, additional variables may include an initial discovery results time, a delta time, and other variables for specifying functions of the discovery bundle. At block 822, if there are not any additional variables to be set, then the process ends. At block 822. If there are any additional variables to be set, then the process passes to block 824. Block 824 illustrates handling prompting the user to set the additional variables and storing the user results for each variable, and the process ends.

Figure 9:
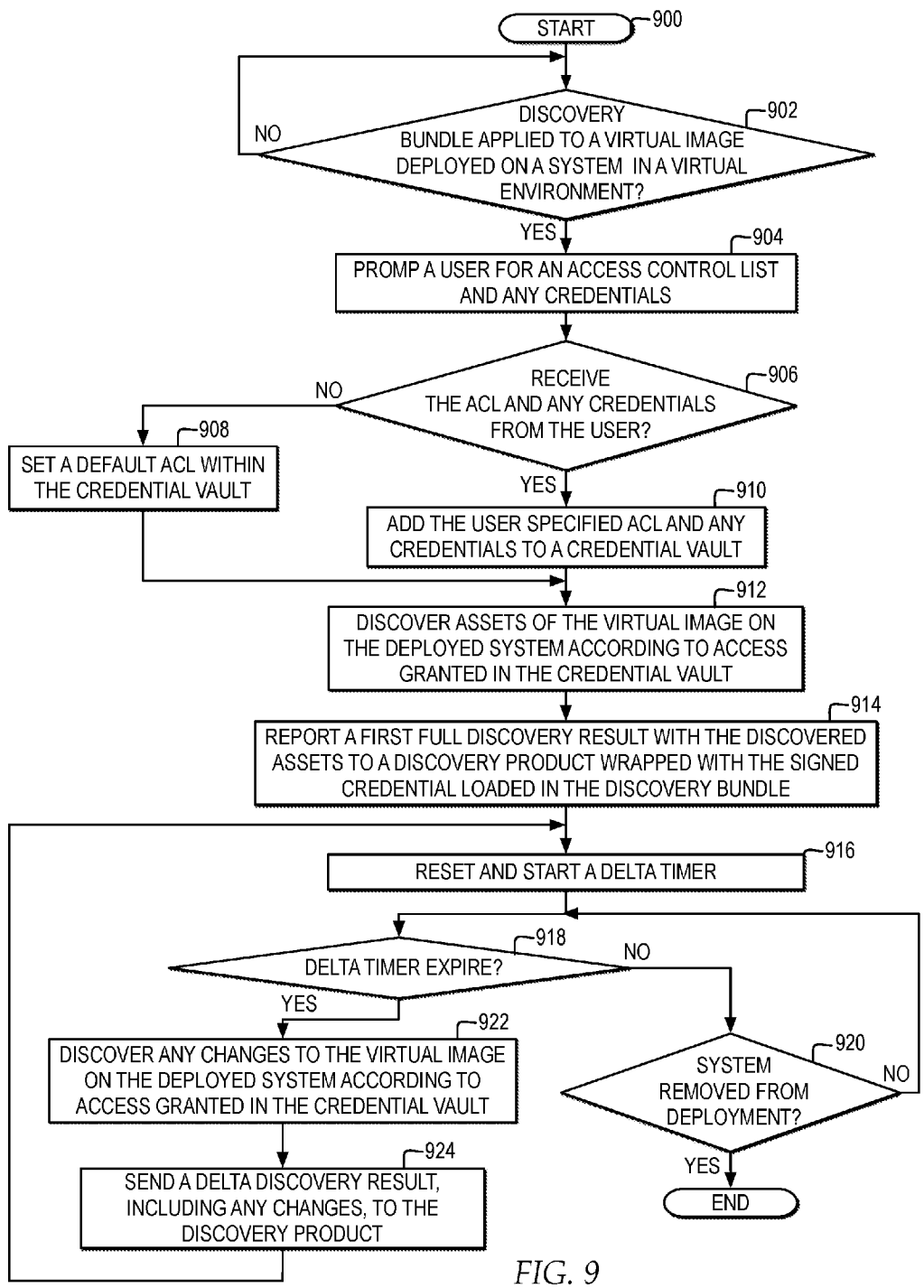
FIG. 9 illustrates a high level logic flowchart of a process and computer program for reporting a discovery report from a discovery bundle of a deployed system in a virtual environment to a discovery product.

FIG. 9 illustrates a high level logic flowchart of a process and computer program product for reporting a discovery report from a discovery bundle of a deployed system in a virtual environment to a discovery product.

In one example, the process and program starts at block 900 and thereafter proceeds to block 902. Block 902 illustrates a determination whether a discovery bundle applied to a virtual image is deployed on a system in a cloud environment. At block 902, if a discovery bundle is applied to an image deployed on a system in a cloud environment, then the process passes to block 904. Block 904 illustrates prompting a user for an access control list (ACL) and any credentials required for accessing bundles within the virtual image. Next, block 906 illustrates a determination whether the discovery bundle receives the ACL and any credentials from a user. At block 906, if the discovery bundle does not receive the ACL from a user, then the process passes to block 908. Block 908 illustrates setting a default ACL within the credential vault, and the process passes to block 912. In one example, a default ACL may be a default list permitting access to the general asset information for the deployed system that is discoverable without any credential and is reportable as general deployed system results. Returning to block 906, if the discovery bundle does receive an ACL and any credentials for the system from the user, then the process passes to block 910. Block 910 illustrates adding the user specified ACL and any credentials to a credential vault, and the process passes to block 912.

Block 912 illustrates discovering assets of the virtual image on the deployed system according to access granted in the credential vault. Next, block 914 illustrates reporting a first full discovery result with the discovered assets to a discovery product wrapped with the signed credential loaded in the discovery bundle. Thereafter, block 916 illustrates resetting and starting a time. Next, block 918 illustrates a determination whether a delta timer has expired. At block 918, if a delta timer has expired, then the process passes to block 922. Block 922 illustrates discovering any changes to the virtual image on the deployed system according to the access granted in the credential vault. Next, block 924 illustrates reporting a delta discovery result, including any changes, to the discovery product, and the process returns to block 916. Returning to block 918, if the delta timer has not expired, then the process passes to block 920. Block 920 illustrates a determination whether the system the discovery bundle is applied on is removed from deployment. At block 920, if the system the discovery bundle is applied on is removed from deployment, then the process ends. At block 920, if the system the discovery bundle is applied on is not removed from deployment, then the process returns to block 918.

Figure 10:
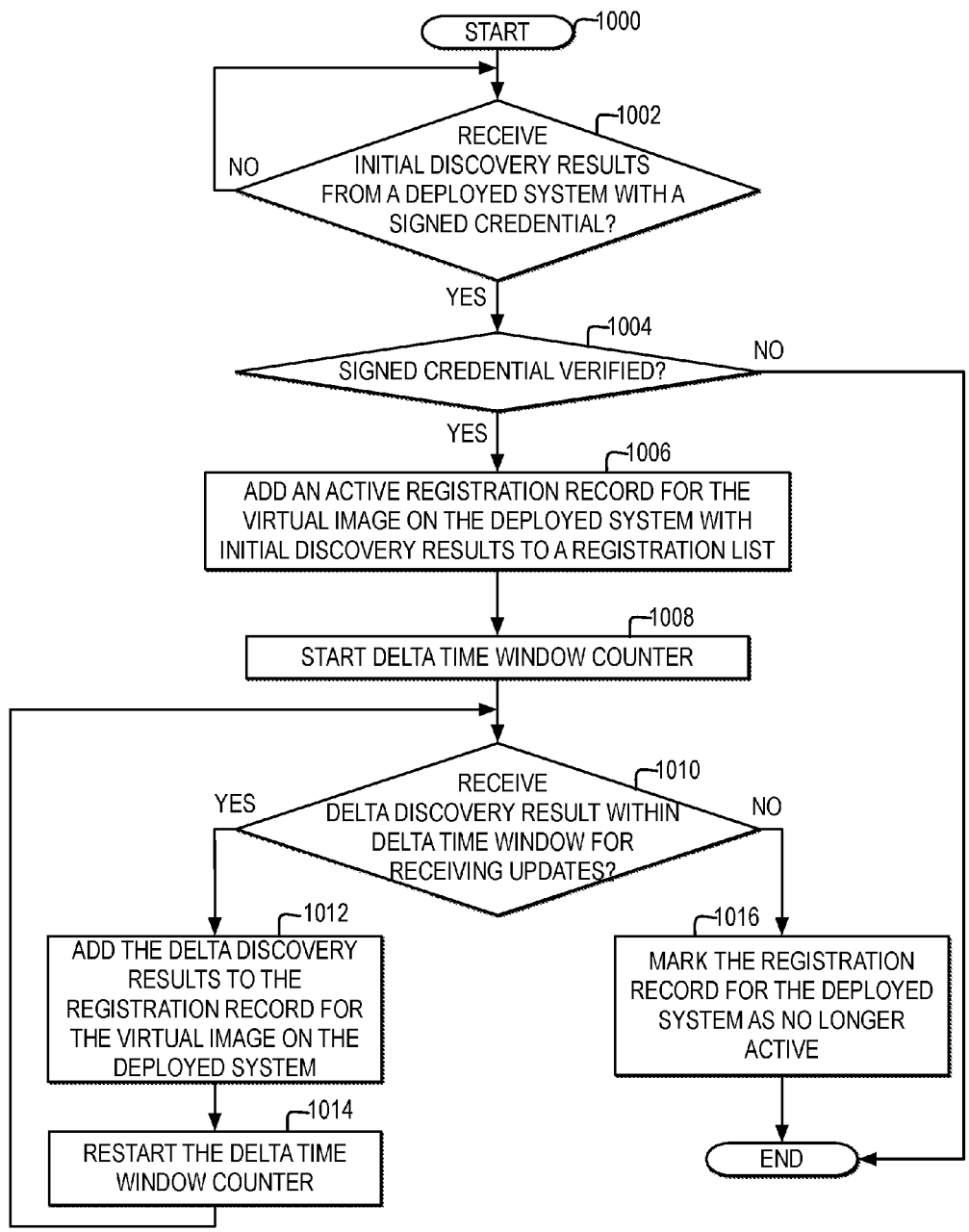
FIG. 10 illustrates a high level logic flowchart of a process and computer program for managing a discovery product for receiving discovery reports from discovery bundles on deployed systems in a virtual environment, managing registration of virtual images based on the discovery reports and synchronizing a database with updates from updated discovery reports, wherein the discovery product is outside the virtual environment.

FIG. 10 illustrates a high level logic flowchart of a process and computer program product for managing a discovery product for receiving discovery reports from discovery bundles on deployed systems in a virtual environment, managing registration of virtual images based on the discovery reports and synchronizing a database with updates from updated discovery reports, wherein the discovery product is outside the virtual environment.

In one example, the process and program starts at block 1000 and thereafter proceeds to block 1002. Block 1002 illustrates a determination whether initial discovery results are received from a deployed system with a signed credential. At block 1002, if initial discovery results re received from a deployed system, with a signed credential, then the process passes to block 1004. Block 1004 illustrates a determination whether the signed credential is verified. At block 1004, if the signed credential is not verified, then the process ends. At block 1004, if the signed credential is verified, then the process passes to block 1006. Block 1006 illustrates adding an active registration record for the virtual image on the deployed system with the initial discovery results to a registration list. Next, block 1008 illustrates starting a delta time window counter. Thereafter, block 1010 illustrates a determination whether a delta discovery result is received within the delta time window for receiving updates. At block 1010, if a delta discovery result is not received within the delta time window for receiving updates, then the process passes to block 1016. Block 1016 illustrates marking the registration record for the virtual image on the deployed system as no longer active, which may effectively remove the registration record from the registration list, and the process ends. Returning to block 1010, if a delta discovery result is received within the delta time window for receiving updates, then the process passes to block 1012. Block 1012 illustrates adding the delta discovery results to the registration record for the virtual image on the deployed system. Next, block 1014 illustrates restarting the delta time window counter, and the process returns to block 1010.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing virtual image discovery, comprising:
    applying, using one or more processors, a discovery bundle component in a virtual image deployed within a virtual environment, wherein the discovery bundle component automatically discovers asset information about one or more application bundles applied to the virtual image;
    prompting, using the one or more processors, a user to provide an access control list specifying credentials for accessing one or more assets of the virtual image on a deployed system hosting the virtual environment;
    in response to the user providing the access control list, storing, using the one or more processors, the access control list in a secured credential vault of the discovery bundle component;
    discovering, using the one or more processors, by the discovery bundle component, the asset information for a selection of at least one of the one or more application bundles applied to the virtual image, wherein the access control list comprises the credentials required for accessing the selection of at least one of the one or more application bundles to discover the asset information; and
    sending, using the one or more processors, by the discovery bundle component, to a discovery product service, the asset information wrapped with a trusted signed certificate for the discovery product service, without sending the credentials used to access the asset information to the discovery product service, wherein the discovery product service is located outside the virtual environment.

2. The method according to claim 1, further comprising:
    preconfiguring, using the one or more processors, the discovery bundle component with the trusted signed certificate of the discovery product service prior to applying the discovery bundle component in the virtual image deployed within the virtual environment, wherein the trusted signed certificate specifies a hostname and an internet protocol address of a host for the discovery product service.

3. The method according to claim 1, wherein applying, using one or more processors, a discovery bundle component in a virtual image deployed within a virtual environment, wherein the discovery bundle component automatically discovers asset information about one or more application bundles applied to the virtual image further comprises:
    applying, using the one or more processors, the discovery bundle component in the virtual image deployed within the virtual environment, wherein the virtual environment comprises one of a virtual machine, a logical partition, and a workload partition.

4. The method according to claim 1, wherein applying, using one or more processors, a discovery bundle component in a virtual image deployed within a virtual environment, wherein the discovery bundle component automatically discovers asset information about one or more application bundles applied to the virtual image further comprises:
    configuring, using the one or more processors, within the discovery bundle component, the asset information that is discoverable by the discovery bundle component about the selection of at least one of the one or more application bundles wherein the discoverable asset information comprises at least one of operating system information, database information, and application server information, wherein the operating system information comprises at least one of file system information, device information, security settings, and operating system limits, wherein the database information comprises at least one of containers, log devices, cluster information, and tablespaces, wherein the application server information comprises at least one of message queues, cluster members, heap size, and connection pools.

5. The method according to claim 1, wherein sending, using the one or more processors, by the discovery bundle component, to a discovery product service, the asset information wrapped with a trusted signed certificate for the discovery product service, without sending the credentials used to access the asset information to the discovery product service, wherein the discovery product service is located outside the virtual environment further comprises:

sending, using the one or more processors, by the discovery bundle component, the asset information in an initial discovery report to the discovery product service within a first time period after the discovery bundle component is applied to the virtual image deployed in the virtual environment, wherein the discovery product service verifies the trusted signed certificate and registers the virtual image based on the initial discovery report.

6. The method according to claim 1, wherein sending, using the one or more processors, by the discovery bundle component, to a discovery product service, the asset information wrapped with a trusted signed certificate for the discovery product service, without sending the credentials used to access the asset information to the discovery product service, wherein the discovery product service is located outside the virtual environment further comprises:

in response to sending the asset information to the discovery product service, resetting and starting a delta timer using the one or more processors;

in response to the delta timer expiring, discovering, using the one or more processors, whether there is at least one update to the asset information for the virtual image since the delta timer was reset; and sending, using the one or more processors, an updated discovery report indicating the virtual image is active and comprising the at least one update to the asset information.

7. The method according to claim 1, wherein applying, using one or more processors, a discovery bundle component in a virtual image deployed within a virtual environment, wherein the discovery bundle component automatically discovers asset information about one or more application bundles applied to the virtual image further comprises:

applying, using the one or more processors, the discovery bundle component in the virtual image deployed within the virtual environment on a deployed system connected within a cloud environment.

8. A system for managing virtual image discovery, comprising:

a processor, coupled with a memory, and configured to perform the actions of:

applying a discovery bundle component in a virtual image deployed within a virtual environment, wherein the discovery bundle component automatically discovers asset information about one or more application bundles applied to the virtual image;

prompting a user to provide an access control list specifying credentials for accessing one or more assets of the virtual image on a deployed system hosting the virtual environment;

in response to the user providing the access control list, storing the access control list in a secured credential vault of the discovery bundle component;

discovering, by the discovery bundle component, the asset information for a selection of at least one of the one or more application bundles applied to the virtual image, wherein the access control list comprises the credentials required for accessing the selection of at least one of the one or more application bundles to discover the asset information; and sending, by the discovery bundle component, to a discovery product service, the asset information wrapped with a trusted signed certificate for the discovery product service, without sending the credentials used to access the asset information to the discovery product service, without sending the credentials used to access the asset information to the discovery product service.

9. The system according to claim 8, wherein the processor is further configured to perform the actions of:

preconfiguring the discovery bundle component with the trusted signed certificate of the discovery product service prior to applying the discovery bundle component in the virtual image deployed within the virtual environment, wherein the trusted signed certificate specifies a hostname and an internet protocol address of a host for the discovery product service.

10. The system according to claim 8, wherein the processor is further configured to perform the actions of:

applying the discovery bundle component in the virtual image deployed within the virtual environment, wherein the virtual environment comprises one of a virtual machine, a logical partition, and a workload partition.

11. The system according to claim 8, wherein the processor is further configured to perform the actions of:

configuring, within the discovery bundle component, the asset information that is discoverable by the discovery bundle component about the selection of at least one of the one or more application bundles wherein the discoverable asset information comprises at least one of operating system information, database information, and application server information, wherein the operating system information comprises at least one of file system information, device information, security settings, and operating system limits, wherein the database information comprises at least one of containers, log devices, cluster information, and tablespaces, wherein the application server information comprises at least one of message queues, cluster members, heap size, and connection pools.

12. The system according to claim 8, wherein the processor is further configured to perform the actions of:

sending, by the discovery bundle component, the asset information in an initial discovery report to the discovery product service within a first time period after the discovery bundle component is applied to the virtual image deployed in the virtual environment, wherein the discovery product service verifies the trusted signed certificate and registers the virtual image based on the initial discovery report.

13. The system according to claim 8, wherein the processor is further configured to perform the actions of:

in response to sending the asset information to the discovery product service, resetting and starting a delta timer using the one or more processors;

in response to the delta timer expiring, discovering whether there is at least one update to the asset information for the virtual image since the delta timer was reset; and sending an updated discovery report indicating the virtual image is active and comprising the at least one update to the asset information.

14. The system according to claim 8, wherein the processor is further configured to perform the actions of:

applying the discovery bundle component in the virtual image deployed within the virtual environment on a deployed system connected within a cloud environment.

15. A computer program product for managing virtual image discovery, the computer program product comprising a non-transitory computer readable storage medium having program instructions embodied therewith, the program instructions executable by a processor to cause the processor to:

apply a discovery bundle component in a virtual image deployed within a virtual environment, wherein the discovery bundle component automatically discovers asset information about one or more application bundles applied to the virtual image;

prompt a user to provide an access control list specifying credentials for accessing one or more assets of the virtual image on a deployed system hosting the virtual environment;

in response to the user providing the access control list, store the access control list in a secured credential vault of the discovery bundle component;

discover, by the discovery bundle component, the asset information for a selection of at least one of the one or more application bundles applied to the virtual image, wherein the access control list comprises the credentials required for accessing the selection of at least one of the one or more application bundles to discover the asset information; and send, by the discovery bundle component, to a discovery product service, the asset information wrapped with a trusted signed certificate for the discovery product service, without sending the credentials used to access the asset information to the discovery product service, wherein the discovery product service is located outside the virtual environment.

16. The computer program product according to claim 15, further comprising the program instructions executable by a processor to cause the processor to:

preconfigure the discovery bundle component with the trusted signed certificate of the discovery product service prior to applying the discovery bundle component in the virtual image deployed within the virtual environment, wherein the trusted signed certificate specifies a hostname and an internet protocol address of a host for the discovery product service.

17. The computer program product according to claim 15, further comprising the program instructions executable by a processor to cause the processor to:

apply the discovery bundle component in the virtual image deployed within the virtual environment, wherein the virtual environment comprises one of a virtual machine, a logical partition, and a workload partition.

* * * * *